(No Model.)
J. BYRNE.
FAUCET.
No. 538,502. Patented Apr. 30, 1895.
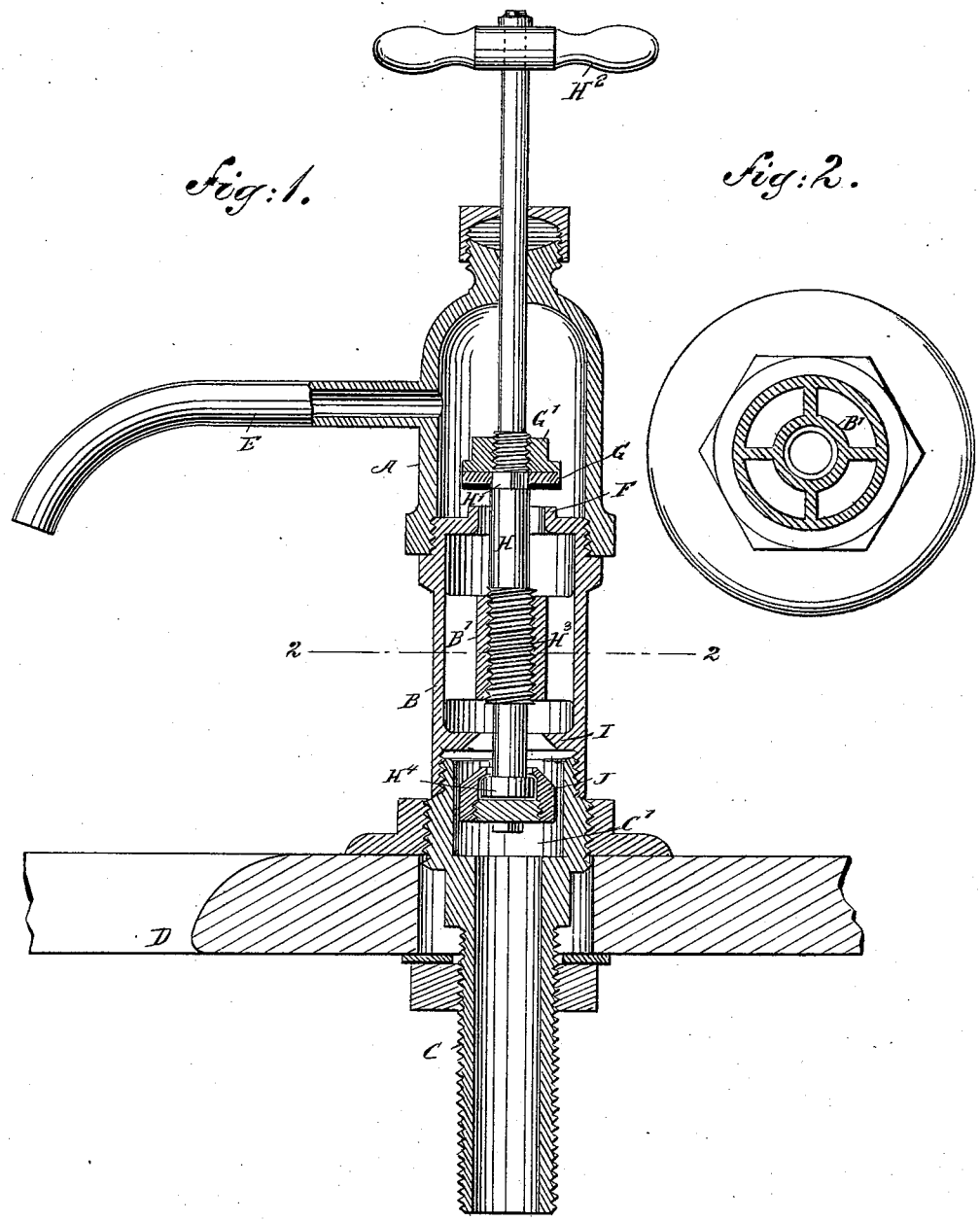

UNITED STATES PATENT OFFICE.

JOHN BYRNE, OF NEW YORK, N. Y., ASSIGNOR TO ROBERT W. RODMAN AND JAMES T. BYRNE, OF SAME PLACE.

FAUCET.

SPECIFICATION forming part of Letters Patent No. 538,502, dated April 30, 1895.

Application filed September 6, 1894. Serial No. 522,268. (No model.)

*To all whom it may concern:*

Be it known that I, JOHN BYRNE, of New York city, in the county of New York and State of New York, have invented a new and Improved Faucet, of which the following is a full, clear, and exact description.

The object of the invention is to provide a new and improved faucet more especially designed for use on basins, sinks, &c., and arranged to permit of readily shutting off the water from the service pipe whenever it is necessary to repair the service valve, valve seat or other part of the faucet.

The invention consists principally of a valve stem held movably in the valve casing and provided with a service valve and an auxiliary cut-off valve, both moving with the said stem.

The invention also consists in certain parts and details and combinations of the same, as will be fully described hereinafter and then pointed out in the claims.

Reference is to be had to the accompanying drawings, forming a part of this specification, in which similar letters of reference indicate corresponding parts in both the figures.

Figure 1 is a sectional side elevation of the improvement, and Fig. 2 is a sectional plan view of the same on the line 2 2 of Fig. 1.

The improved faucet is provided with a casing preferably made in three sections, A, B and C, screwed one on the other as indicated in Fig. 1, the lower section being adapted to connect with the service pipe carrying the water to the faucet. The lower section is fastened in the usual manner to the support D of the basin, sink, or other part on which the faucet is applied. The upper section A is provided with the spout E, and the middle section is provided at its upper end with a valve seat F, adapted to be engaged by the disk valve G held on the square part $H'$ of the stem H fitted to move in the valve casing so as to seat or unseat the valve G.

The valve G is preferably provided with a facing of rubber, leather or other suitable material so as to produce a perfect joint on the valve seat F, to prevent leakage. The valve G is held in position on the stem H by a nut $G'$ screwing on a threaded portion of the stem, as is plainly shown in Fig. 1. The upper end of the stem passes through a stuffing box in the top of the section A, and on the outer end of this valve stem is held a removable handle $H^2$ adapted to be taken hold of by the user of the faucet, to move the stem H to open and close the valve G for obtaining a supply of water, or shutting off the same, as the case may be. The valve stem H is preferably held movable in the casing by a threaded portion $H^3$ screwing in a spider $B'$, forming part of the middle section B, so that the operator on turning the handle $H^2$ can open and close the valve G.

In the lower part of the middle section B is arranged a second valve seat I, adapted to be engaged by an auxiliary valve J, held on the lower end of the stem H and extending into a recess $C'$ formed in the upper part of the lower section C. This valve J is preferably held loosely on a flange $H^4$ formed on the lower end of the valve stem, and the valve is normally off of its seat I at the time the faucet is used in the ordinary manner by the operator, so that the water supply is obtained when the valve G is opened, as above described.

When it is desired to repair the valve seat F or the valve G, or any other part in the faucet, then the operator turns the handle $H^2$ so as to move the stem H upward beyond the normal position in opening the valve G, so that the valve J is finally moved into engagement with the seat I so as to shut off the water from the section B, section A and spout E. The operator can now remove the handle $H^2$ from the stem, then unscrew the section A from the section B and slip the section A off of the upper end of the stem H, to obtain ready access to the valve seat F and the valve G. Either of the two parts can thus be readily repaired, or a new valve put in place and the valve seat F ground if necessary, or other repairs can be done without danger of the water from the service pipe passing into the section B.

It is understood that in the faucets heretofore constructed it was necessary for the plumber to shut off the water supply in the service pipe from the main, in order to do repairing of a faucet in a building. By the arrangement described any individual faucet in a building can be repaired without shutting off the supply of water to the other faucets.

Having thus fully described my invention, I claim as new and desire to secure by Letters Patent—

1. In a faucet the combination of a casing having a passage-way provided with an outlet and two valve-seats, one above the other, a valve-stem in the passage-way, valves on said valve-stem adapted, when the stem is moved, to be seated on the respective seats, whereby the flow of water through the passage-way is controlled, the valve which engages the seat nearest the outlet of the passage-way of the casing being removable, and means adapted to hold the lower valve to its seat when said upper valve is removed, said means being located below the upper valve, substantially as set forth.

2. In a faucet, the combination of a casing having a valve seat at each end and a threaded portion between the seats, a valve stem having a central threaded portion to engage the threaded portion of the casing and valves on opposite ends of said stem adapted to be seated on the respective valve seats in the casing, substantially as set forth.

3. In a faucet, the combination of a sectional casing one of the sections of which has an internally screw-threaded spider and valve seats formed at opposite ends of said spider, a valve stem having a screw-threaded portion to engage said spider, a valve on the lower end of said stem to engage the seat at the lower end of the spider, and a removable valve carried on the upper end of the stem to engage the upper valve seat, substantially as set forth.

JOHN BYRNE.

Witnesses:
RUDOLPH VARÉ,
J. H. KATTENSTROTT.